(12) United States Patent
Wei et al.

(10) Patent No.: US 11,360,441 B1
(45) Date of Patent: Jun. 14, 2022

(54) METHOD AND APPARATUS FOR HIGH-ORDER ITERATIVE SELF-LEARNING CONTROL FOR ROBOTIC FISH, AND STORAGE MEDIUM

(71) Applicant: Guangzhou University, Guangzhou (CN)

(72) Inventors: Yunshan Wei, Guangzhou (CN); Yingyu Chen, Guangzhou (CN); Kai Wan, Huizhou (CN); Qingyuan Xu, Guangzhou (CN); Zhijia Zhao, Guangzhou (CN)

(73) Assignee: GUANGZHOU UNIVERSITY, Guangzhou (CN)

( * ) Notice: Subject to any disclaimer, the term of this patent is extended or adjusted under 35 U.S.C. 154(b) by 0 days.

(21) Appl. No.: 17/464,057

(22) Filed: Sep. 1, 2021

(30) Foreign Application Priority Data

May 19, 2021 (CN) .......................... 202110545908.0

(51) Int. Cl.
*G05B 13/02* (2006.01)
*G05B 19/4155* (2006.01)

(52) U.S. Cl.
CPC ..... *G05B 13/0265* (2013.01); *G05B 19/4155* (2013.01); *G05B 2219/40499* (2013.01)

(58) Field of Classification Search
None
See application file for complete search history.

(56) References Cited

U.S. PATENT DOCUMENTS

| | | | | |
|---|---|---|---|---|
| 10,962,976 B1* | 3/2021 | Wu | ........................... | G05D 1/10 |
| 11,169,523 B2* | 11/2021 | Oh | ........................... | G01V 11/00 |
| 2004/0030420 A1* | 2/2004 | Ulyanov | ............ | G05B 13/0285 700/48 |
| 2004/0043795 A1* | 3/2004 | Zancewicz | ........... | H01Q 3/2605 455/562.1 |
| 2010/0198371 A1* | 8/2010 | Takagi | ................. | G05B 19/042 700/44 |
| 2021/0354800 A1* | 11/2021 | Yu | .............................. | B60F 5/02 |

FOREIGN PATENT DOCUMENTS

CN 112034865 A * 12/2020

* cited by examiner

*Primary Examiner* — Mohammad Ali
*Assistant Examiner* — David Earl Ogg
(74) *Attorney, Agent, or Firm* — Getech Law LLC; Jun Ye (57) ABSTRACT

The invention relates to a field off artificial intelligence (AI) technologies, and discloses a method and an apparatus for high-order iterative self-learning control for a robotic fish, and a storage medium; the control method performs preferential iterative calculation on control gain elements in the control gain set to obtain a target control gain set; and performs high-order iterative calculation according to the target control gains, the first control input thrust and the first tracking error to obtain a target control input thrust, and then controls a robotic fish to swing according to the target control input thrust to obtain an expected speed. In this way, complete tracking and rapid convergence of a swim speed of a robotic fish in the whole operation space may be achieved.

9 Claims, 5 Drawing Sheets

METHOD AND APPARATUS FOR HIGH-ORDER ITERATIVE SELF-LEARNING CONTROL FOR ROBOTIC FISH, AND STORAGE MEDIUM

TECHNICAL FIELD

The present disclosure relates to a field of artificial intelligence (AI) technologies, particularly to a method and an apparatus for high-order iterative self-learning control for a robotic fish, and a storage medium.

BACKGROUND

At present, autonomous underwater robots are widely used in marine detection, scientific research, and business tasks. In various underwater robots, a fish-shaped robot (i.e. a robotic fish) has the most application potential due to its high efficiency, high maneuverability, low noise, etc. Even though some efforts have been made in a propulsion mechanism, an actuator, and a mechanical structure of fish swim, they are not enough to develop an autonomous robotic fish capable of freely swimming in an unstructured environment like a true fish. One of major challenges is the difficulty in motion control of a robotic fish.

The research on motion control of a robotic fish mainly focuses on two aspects: 1) generating a fish-like swimming gait in a robotic fish; 2) driving a robotic fish to achieve the expected motion. The former explores coordinated movement of the drive component of the robotic fish, and the latter focuses on controlling the movement of the entire body of the robotic fish. From the perspective of a control theory, the method for generating a swimming gait may be divided into a kinematics-based method and a bionic-based method. The kinematics-based method is intended to mimic the body movement of a fish by a discrete mechanical multi-link connected by a rotary joint, and the bionic method converts a fluctuation body movement of a fish into a joint movement of a robotic fish by using a central mode generator. Even though the method for generating a swimming gait may be configured to generate fish-like swimming of the robotic fish, the method is open-loop and may not assist the robotic fish in achieving the expected motion.

In order to control the robotic fish to achieve the expected movement, the methods such as PID control, fuzzy logic control and sliding mode control are provided. However, the conventional control methods have two disadvantages: 1) it is necessary to know a systematic and precise mathematical model; 2) asymptotic error convergence only may be achieved in a time domain; 3) a tracking error convergence speed is slow. In practice, many applications may require the robotic fish to swim along a predetermined speed trajectory and repeatedly perform the task. For example, a robotic fish is configured to perform reciprocating transportation between two wharfs, and the robotic fish is required to swim at a predetermined speed trajectory; for rendezvous and docking between the robotic fish and the underwater strut, the robotic fish must move at a given speed trajectory; pipeline cleaning or pipeline leak detection is performed by the robotic fish; the systems may be represented by a dynamic system with repeated motion properties.

SUMMARY

The disclosure provides a method and an apparatus for high-order iterative self-learning control for a robotic fish, and a storage medium, which achieves complete tracking and rapid convergence of a swim speed of a robotic fish in the entire operation interval.

One embodiment of the disclosure provides a method for high-order iterative self-learning control for a robotic fish. The method includes:

constructing a first control gain set, the first control gain set including N control gain elements, each of the control gain elements including M control gains and one element fitness corresponding to each of the control gain elements; M and N being positive integers;

performing preferential iteration on control gain elements in the first control gain set to obtain a target control gain set, and outputting M control gains in the control gain element with the highest fitness in the target control gain set as target control gains;

performing high-order iterative calculation according to the target control gains, the first control input thrust and the first tracking error to obtain a target control input thrust, and controlling a robotic fish to swing according to the target control input thrust to obtain an expected speed; the initial value of the first control input thrust being a preset value, and the first tracking error being calculated according to the swing speed and the expected speed.

Further, calculating one fitness corresponding to each of the control gain elements according to the control gain and the first tracking error, is specifically:

acquiring control gain elements to be calculated;

calculating a second control input thrust according to the M control gains in the control gain elements to be calculated and the first tracking error;

controlling the robotic fish to swing according to the second control input thrust to obtain a swing speed, and obtaining a sum of absolute values of second tracking errors according to the difference between the swing speed and the expected speed;

obtaining the fitness of the control gain elements to be calculated according to the difference between a preset first threshold and the sum of absolute values of the second tracking errors.

Further, performing preferential iteration on control gain elements in the first control gain set to obtain a target control gain set specifically includes:

expanding the first control gain set: sequentially determining control gain elements in the first control gain set to select control gain elements satisfying a first preset condition, and performing crossover operator and mutation operator calculation on the control gain elements satisfying a preset condition to obtain a plurality of new control gain elements for expanding the first control gain set, and adding the plurality of new control gain elements to the first control gain set;

preferentially reserving the first control gain set: preferentially reserving all the control gain elements in the expanded first control gain set according to a second preset condition to obtain an optimized first control gain set until the number of iterations satisfies a preset second threshold, and outputting the first control gain set as a target control gain set.

Further, preferentially reserving all control gain elements in the expanded first control gain set according to a second preset condition to obtain a target control gain set, is specifically:

selecting the control gain elements in the expanded first control gain set according to a roulette strategy and an elitism strategy to obtain an optimized first control gain set.

Further, performing high-order iterative calculation according to the target control gains, the first control input thrust and the first tracking error to obtain a target control input thrust, specifically includes:

iteratively calculating a target control input thrust according to the target control gains, the first control input thrust and the first tracking error, controlling the robotic fish to swing according to the current target control input thrust in each iterative calculation, and then obtaining a target tracking error, and according to the current target tracking error and the target control input thrust, updating the first control input thrust and the first tracking error until outputting the current target control input thrust when the target tracking error satisfies a preset index condition.

Further, controlling the robotic fish to swing according to the target control input thrust to obtain an expected speed, specifically includes: controlling the robotic fish to swing according to a target control input thrust sequence to obtain an expected speed sequence, thereby achieving an expected trajectory.

Another embodiment of the disclosure provides an apparatus for high-order iterative self-learning control for a robotic fish. The apparatus includes a control gain initialization module, a target control gain calculation module and a target control input thrust calculation module;

the control gain initialization module is configured to construct a first control gain set, the first control gain set including N control gain elements, each of the control gain elements including M control gains and one element fitness corresponding to each of the control gain elements; M and N being positive integers;

the target control gain calculation module is configured to perform preferential iteration on control gain elements in the first control gain set to obtain a target control gain set, and output M control gains in the control gain element with the highest fitness in the target control gain set as target control gains;

the target control input thrust calculation module is configured to perform high-order iterative calculation according to the target control gains, the first control input thrust and the first tracking error to obtain a target control input thrust, and control the robotic fish to swing according to the target control input thrust to obtain an expected speed; the initial value of the first control input thrust being a preset value, and the first tracking error being calculated according to the swing speed and the expected speed.

Further, in the control gain initialization module, calculating one fitness corresponding to each of the control gain elements according to the control gains and the first tracking error, is specifically:

acquiring control gain elements to be calculated;

calculating a second control input thrust according to M control gains in the control gain elements to be calculated and the first tracking error;

controlling the robotic fish to swing according to the second control input thrust to obtain a swing speed, and obtaining a sum of absolute values of second tracking errors according to the difference between the swing speed and the expected speed;

obtaining the fitness of the control gain elements to be calculated according to the difference between a preset first threshold and the sum of absolute values of the second tracking errors.

Further, in the target control gain calculation module, performing preferential iteration on control gain elements in the first control gain set to obtain a target control gain set, specifically includes:

expanding the first control gain set: sequentially determining the control gain elements in the first control gain set to select control gain elements satisfying a first preset condition, and performing cross operator and mutation operator calculation on the control gain elements satisfying a preset condition to obtain a plurality of new control gain elements for expanding the first control gain set, and adding the new control gain elements to the first control gain set;

preferentially reserving the first control gain set: preferentially reserving all the control gain elements in the expanded first control gain set according to a second preset condition to obtain an optimized first control gain set until the number of iterations satisfies a preset second threshold, and outputting the first control gain set as a target control gain set.

Another embodiment of the disclosure provides a readable storage medium. The storage medium includes computer programs stored thereon configured to control the device on the readable storage medium to execute the method for high-order iterative self-learning control for a robotic fish as described in the any method embodiments of the disclosure.

The embodiments of the present disclosure have the following beneficial effects:

the disclosure provides a method and an apparatus for high-order iterative self-learning control for a robotic fish, and a storage medium. The control method constructs a first control gain set and performs preferential iteration on control gains in the first control gain set to continuously optimize control gains in the first control gain set and select target control gains according to the fitness, and performs high-order iteration according to the target control gains and the tracking error to continuously optimize the control input thrust of the robotic fish to finally obtain a target control input thrust. The robotic fish swings according to the target control input thrust to obtain an expected speed thereby achieving an expected trajectory; the key of the technical solution relies on that the robotic fish achieves complete tracking and rapid convergence of a swim speed of a robotic fish in the whole operation space according to high-order iterative calculation of the target control gains and the tracking error on the control input thrust.

DETAILED DESCRIPTION

The present disclosure is further described in detail below in combination with embodiments and drawings, however, implementations of the disclosure are not limited here.

The technical scheme in embodiments of the present disclosure will be described clearly and completely in combination with the figures in embodiments of the present disclosure. It is obvious that the embodiments described are only a part of embodiments in the present disclosure, rather than the whole embodiments. On the basis of embodiments of the present disclosure, all other embodiments obtained by those skilled in the art without creative work are within the protection scope of the present disclosure.

Figure 1:
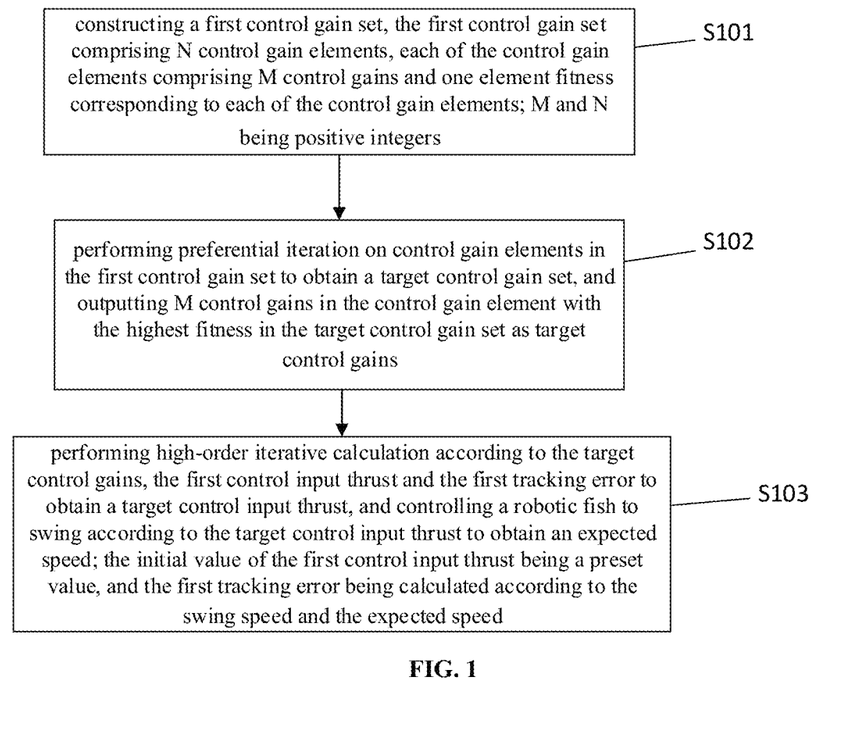
FIG. 1 is a flowchart of a method for controlling a robotic fish provided in one embodiment of the present disclosure.

As illustrated in FIG. 1, a method for high-order iterative self-learning control for a robotic fish provided in one embodiment of the disclosure includes:

At block S101: a first control gain set is constructed, the first control gain set including N control gain elements, each of the control gain elements including M control gains and one element fitness corresponding to each of the control gain elements; M and N being positive integers.

At block S102: preferential iteration is performed on control gain elements in the first control gain set to obtain a target control gain set, and M control gains in the control gain element with the highest fitness in the target control gain set are output as target control gains.

At block S103: high-order iterative calculation is performed according to the target control gains, the first control input thrust and the first tracking error to obtain a target control input thrust, and a robotic fish is controlled to swing according to the target control input thrust to obtain an expected speed; the initial value of the first control input thrust being a preset value, and the first tracking error being calculated according to the swing speed and the expected speed.

In at least one embodiment:

At block S101: a first control gain set is constructed, the first control gain set including N control gain elements, each of the control gain elements including M control gains and one element fitness corresponding to each of the control gain elements; M and N being positive integers;

calculating one fitness corresponding to each of the control gain elements according to the control gain and the first tracking error sequence, specifically includes:

acquiring control gain elements to be calculated;

calculating a second control input thrust sequence according to the M control gains in the control gain elements to be calculated and the first tracking error sequence;

controlling the robotic fish to swing according to the second control input thrust sequence to obtain a swing speed sequence, and obtaining a sum of absolute values of second tracking error sequences according to the difference between the swing speed sequence and the expected speed sequence;

obtaining the fitness of the control gain elements to be calculated according to the difference between a preset first threshold and the sum of absolute values of the second tracking error sequences.

At block S102: the first control gain set is expanded: control gain elements in the first control gain set are sequentially determined to select control gain elements satisfying a first preset condition, and crossover operator and mutation operator calculations are performed on the control gain elements satisfying a preset condition to obtain a plurality of new control gain elements for expanding the first control gain set, and add the plurality of new control gain elements to the first control gain set;

the first control gain set is preferentially reserved: the control gain elements in the expanded first control gain set are preferentially reserved according to a roulette strategy and a elitism strategy to obtain an optimized first control gain set until the number of iterations satisfies a preset second threshold, and the first control gain set is output as a target control gain set;

then, M control gains in the control gain element with the highest fitness in the target control gain set are selected as target control gains.

At block S103: a target control input thrust sequence is iteratively calculated according to the target control gains, the first control input thrust sequence and the first tracking error sequence, the robotic fish is controlled to swing according to the current target control input thrust sequence in each iterative calculation, thereby a target tracking error sequence is obtained, and according to the current target tracking error sequence and the target control input thrust sequence, the first control input thrust sequence and the first tracking error sequence are updated until the current target control input thrust sequence is output when the target tracking error sequence satisfies a preset index condition, and the robotic fish is controlled to swing according to the target control input thrust sequence to obtain an expected speed sequence and swim according to the expected trajectory.

More detailed examples are as follow:

Block A: a dynamic mathematical model and a high-order iteration control law of a dual-link robotic fish are constructed;

Block A1: a dynamic mathematical model of a dual-link robotic fish when moving constructed is:

$$\overline{M}\dot{V}_j(t) = -\tau V_j^2(t) + F_j(t) \tag{1}$$

in which, $j \in \{0, 1, 2, \ldots\}$ represents number of iterations, $t \in [0, T]$ represents time, $\overline{M} = 0.4$ kg is mass of a dual-link robotic fish, $\tau = 165.7056$ kg/m is a water resistance coefficient, $V_j(t)$ is a swing speed of a dual-link robotic fish in jth iteration at t time, $F_j(t)$ represents a forward thrust (that is, a control input thrust) generated by tail motion in the jth iteration at t time. Setting a sampling interval to $T_s = 0.1$, the swing speed $V_j(t)$ of the dual-link robotic fish is sampled to obtain a sampling sequence of the swing speed $V_j(i \cdot T_s)$, $i = \{0, 1, \ldots, M\}$, $M = \lfloor T/T_s \rfloor$. Similarly, a control input thrust $F_j(t)$ is sampled to obtain a sampling sequence $F_j(i \cdot T_s)$ of a control input thrust. The dynamic mathematical model when the dual-link robotic fish moves constructs a computational relationship between the swing speed of the dual-link robotic fish $V_j(t)$ and the input control thrust $F_j(t)$.

When the input control thrust $F_j(t)$ is initialized, the initial value of the input control thrust $F_j(t)$ is taken as an input parameter of the model $\overline{M}\dot{V}j(t) = -\tau V_j^2(t) + F_j(t)$, and a swing speed sequence of a dual-link robotic fish is calculated.

Setting a swing speed sequence $V_j(i \cdot T_s)$ to a system state $x_j(i)$, the control input thrust sequence $F_j(i \cdot T_s)$ is a control input $u_j(i)$ of a system, and a definition using a derivative is $\dot{V}_j(i \cdot T_s) \approx (V_j((i+1) \cdot T_s) - V_j(i \cdot T_s))/T_s$, an equation (1) may be discretized as a discrete dynamic system as follow:

$$\begin{cases} x_j(i+1) = x_j(i) + \overline{A}x_j^2(i) + \overline{B}u_j(i), \\ y_j(i) = x_j(i) \end{cases} \text{ in which, } \overline{A} = \frac{\tau \cdot T_s}{M}, \overline{B} = \frac{T_s}{M}; \tag{2}$$

in which, $\bar{A}=-t\cdot T_s/M$, $\bar{B}=T_s/M$;

Setting a nonlinear part $f(x_j(i))=x_j(i)+\bar{A}x_j^2(i)$ containing a system state in an equation (2), a general form of a discrete nonlinear dynamic system as follow is easily obtained:

$$\begin{cases} x_j(i+1) = f(x_j(i)) + Bu_j(i), \\ y_j(i) = Cx_j(i), \end{cases} \quad (3)$$

in which, $B=\bar{B}$, $C=1$, $j\in\{0, 1, 2, \ldots\}$ represent the number of iterations, $i=\{0,1,\ldots,M\}$ ($M=\lfloor T/T_s \rfloor$ represents discrete time points, $x_j(i)\in R$, $u_j(i)\in R$ and $y_j(i)\in R$ represent system state, control input and control output correspondingly. $B\in R$ and $C\in R$ are an input coefficient and an output coefficient of a system correspondingly, $f(\cdot)\in R$ is a state function of a system. For $i\in\{0,1,\ldots,M\}$, $y_d(i)=Cx_d(i)$ represents expected output, in which, $x_d(i)$ is a corresponding expected state. $e_j(i)=y_d(i)-y_j(i)$ represents a tracking error sequence of a dual-link robotic fish at jth iteration.

Block A2: A high-order iteration control law of a dual-link robotic fish is constructed and a value range of control gains are determined;

according to a discrete nonlinear dynamic system (3), the following method for high-order iterative learning control is proposed:

$$u_{j+1}(i) = \sum_{v=1}^{N} W_v u_{j-v+1}(i) + \sum_{v=1}^{N} L_v e_{j-v+1}(i+1) \quad (7)$$

in which, $N \geq 1$ is an order of a high-order iteration control law (7), for $v=1, 2, \ldots, N$, and $W_v \in R$ and $L_v \in R(|L_v|\leq s_L)$ are control gains.

For a discrete nonlinear dynamic system (3), the following conditions are preset:

condition 1: for all iterations j, an initial state for the discrete nonlinear dynamic system (3) satisfies the following equation:

$$x_j(0)=x_d(0) \quad (4)$$

condition 2: for a nonlinear function $f(\cdot)$ of the discrete nonlinear dynamic system (3) satisfies a global Lipschitz condition, that is, for $\forall \hat{x}, \check{x} \in R$, $$|f(\bar{x})-f(\tilde{x})|\leq l_x|\bar{x}-\tilde{x}| \quad (5)$$

in which, $l_x>0$ is a Lipschitz constant.

condition 3: $CB\neq 0$.

condition 4: the only control input $u_d(i)$ is existed so that an expected output trajectory $y_d(i)$ is accessible.

$$\begin{cases} x_d(i+1) = f(x_d(i), i) + Bu_d(i) \\ y_d(i) = Cx_d(i) \end{cases} \quad (6)$$

When conditions 1-4 are established at the same time, a high-order iterative learning control law (7) is applied to control a swing speed of a dual-link robotic fish, if the tracking errors of the dual-link robotic fish are $$\lim_{j \to +\infty} e_j(i) = 0,$$

$i\in\{0,1,\ldots,M\}$, the control gains $W_v$ and $L_v$ ($|L_v|\leq s_L$) of the robotic fish need to satisfy the following conditions (that is, value ranges of the control gains are determined):

$$\begin{cases} \sum_{v=1}^{N} W_v = 1, & (8) \\ |W_v - L_v CB| \leq \gamma_v, & (9) \\ \sum_{v=1}^{N} \gamma_v < 1, & (10) \end{cases}$$

Block B: target control gains of a dual-link robotic fish are calculated;

Block B1: a coding strategy of control gain elements (a coding strategy represents the actual problem as a set of codes to enable the computer to identify and perform the corresponding calculation) is determined;

the control gains to be optimized in the high-order iterative learning control law (7) are $W_v$ and $L_v$ ($v=1, 2, \ldots, N$), therefore, real coding is adopted to represent control gains. Since a convergence condition (8) is established, $$W_N = 1 - \sum_{v=1}^{N-1} W_v$$

is obtained. Therefore, a variable vector $\lambda \in R^{1\times(2N-1)}$ is adopted as a control gain element, and the coding strategy of the control gain element is represented as:

$$\lambda=[W_1 W_2 \ldots W_{N-1} L_1 L_2 \ldots L_N] \quad (11)$$

Block B2: a control gain set is initialized and a fitness of a control gain element is calculated;

according to the value range of the control gains determined at block A2, P control gain elements in the control gain set are initialized, P=100; the control gains in the control gain elements satisfy (8)-(10) equations;

$$\begin{cases} \sum_{v=1}^{N} W_v = 1, & (8) \\ |W_v - L_v CB| \leq \gamma_v, & (9) \\ \sum_{v=1}^{N} \gamma_v < 1, & (10) \end{cases}$$

The control gain elements $\lambda_h \in R^{1\times(2N-1)}$ in the control gain set are represented as:

$$\lambda_h=[W_1^{(h)} W_2^{(h)} \ldots W_{N-1}^{(h)} L_1^{(h)} L_2^{(h)} \ldots L_N^{(h)}] \quad (12)$$

the corresponding initialization vectors are $\lambda_h^{ini} \in R^{1\times(2N-1)}$. On the other hand, for a variable $\lambda_h$, set $Y_h(i,\lambda_h)$ to an output of the corresponding hth control gain element of a system at the ith time point. To evaluate the adaptability of a control gain element, the fitness function of the control gain element h is established as follows:

$$fit_h(\lambda h)=M_\alpha - E_h(\lambda_h) \quad (13)$$

in which, $M_a$ is a large constant, and $\lambda_h(\lambda_h)$ is a sum of absolute values of second tracking errors, that is, $$E_h(\lambda_h) = \sum_{i=0}^{M} |y_d(i) - Y_h(i, \lambda_h)| \qquad (14)$$

According to the fitness function (13) and the initial variable $\lambda_h^{ini}$, the initial fitness $fit_h^{ini}$ of the control gain element h is obtained, and the initial $fit^{ini} \in R^P$ fitness of the control gain set is obtained as follows:

$$fit^{ini}[fit_1^{ini} fit_2^{ini} \ldots fit_P^{ini}]^T \qquad (15)$$

a control gain set $pop^{ini} \in R^{P \times 2N}$ is further constructed as:

$$pop^{ini} = [\lambda^{ini} fit^{ini}] \qquad (16)$$

in which, the initial variable of the control gain element is:

$$\lambda^{ini} = [\lambda_1^{ini} \lambda_2^{ini} \ldots \lambda_P^{ini}]^T \qquad (17)$$

βth row, αth column in the equation (17) represents an $\alpha(1 \leq \alpha \leq 2N-1)$ th control gain of a control gain element $\beta(1 \leq \beta \leq P)$. The last column of the equation (16) is a fitness value corresponding to the control gain element.

One embodiment of Block B2 is: when the order of the high-order iterative learning control law (7) is 2, there are 4 control gains needing to be optimized, that is $W_1$, $W_2$, $L_1$, $L_2$; at the same time, $W_2 = 1 - W_1$ may be obtained according to the convergence condition (8), therefore, the control gains needing to be optimized are $W_1$, $L_1$, $L_2$;

According to the convergence conditions (8)-(10), the ranges of $W_1$, $L_1$, $L_2$ are [0.7, 0.8], [0.4, 0.5] and [0.4, 0.5] correspondingly, and $W_1$, $L_1$, $L_2$ are initialized within the range; the control gain elements in the control gain set are determined 100, random numbers in the intervals [0.7, 0.8], [0.4, 0.5] and [0.4, 0.5] are randomly selected as $W_1$, $L_1$, $L_2$ of each control gain element by a heuristic method, specifically:

a value range of a first control gain: W1min=0.7; W1max=0.8;

a value range of a second control gain: L1min=0.4; L1max=0.5;

a value range of a third control gain: L2 min=0.4; L2max=0.5;

a random number of the first control gain is generated: iniW1=W1min+(W1max−W1min)*rand(P,1);

a random number of the second control gain is generated: iniL1=L1min+(L1max−L1min)*rand(P,1);

a random number of the third control gain is generated: iniL2=L2 min+(L2max−L2 min)*rand(P,1);

According to the initial value of the control gain and the equation (13), the fitness initial value corresponding to the control gain element is calculated: inifit=fitness(iniW1, iniL1,iniL2)); control gain elements are constructed, the first three columns being control gains, and the last column being fitness values: inipop=[iniW1, iniL1, iniL2, inifit];

the method for initializing a control gain set helps calculate rapid convergence of the target control gain process.

Block B3: the initialized control gain set is expanded;

one expansion scheme at block B3 is that it depends on a crossover probability $0 < p_c < 1$ whether a control gain element needs to crossed. For a control gain element h', h'=1, 3,5, . . . , P−1, a random number $r_{h'}$ between 0 and 1 is generated. If it is determined $r_{h'} > p_c$, crossover operation is performed. Or else, no crossover operation is performed. Since real coding is adopted, an arithmetic cross operator is selected for calculation. Assume that variable vectors of the control gain elements h' and h'+1 needing to be crossed in the control gain set are represented as par_$\lambda_{h'}$ and par_$\lambda_{h'+1}$ correspondingly. After crossover, two new control gain elements are generated, the variable vectors being represented as chi_$\lambda_{h'}$, chi_$\lambda_{h'+1}$, the calculation method of chi_$\lambda_{h'}$ and chi_$\lambda_{h'+1}$ is:

$$\begin{cases} chi\_\lambda_{h'} = \eta_{h'} \cdot par\_\lambda_{h'} + (1-\eta_{h'}) \cdot par\_\lambda_{h'+1} \\ chi\_\lambda_{h'+1} = (1-\eta_{h'}) \cdot par\_\lambda_{h'} + \eta_{h'} \cdot par\_\lambda_{h'+1} \end{cases} \qquad (18)$$

in which, h'=1, 3, 5, . . . , P−1, $\eta_{h'} \in (0,1)$ is a crossover weight of par_$\lambda_{h'}$ and par-$\lambda_{h'+1}$.

One embodiment of block B3 is:

first, third, fifth . . . (P−1) control gain elements are determined; if a crossover condition is satisfied, apply an equation (18) to perform crossover operation on the control gain element par1 and the next control gain element par2 to generate corresponding two new control gain elements chi1 and chi2, the calculation process being as follows:

function crossover( )
eta=0.5; //crossover weight
if(rand<Pc) //if the random number is less than a crossover probability, crossover operation is performed
for i=1:3 I/cross three control gains
chi1(i)=eta.*par1(i)+(1−eta).*par2(i);
chi2(i)=eta.*par2(i)+(1−eta).*par1(i);
end
//a 4th variable is a fitness value
chi1(4)=fitness(chi1(1), chi1(2), chi1(3));
chi2(4)=fitness(chi2(1), chi2(2), chi2(3));
else //direct inheritance if not satisfying a crossover condition
chi1=par1;
chi2=par2;
end The expansion scheme at block B3 may be further: it may be determined whether a certain control gain element needs to be mutated according to a mutation probability $0 < p_m < 1$. For the control gain element h, a value $r_h$ between 0 and 1 is randomly generated. If $r_h > p_m$, mutation operation is performed. Or else, no mutation operation is performed. Setting a variable vector of the control gain element needing to be mutated to par_$\lambda_h$ and a variable vector of a new control gain element after mutation to chi_$\lambda_h$, the calculation method of the chi_$\lambda_h$ is:

$$chi\_\lambda_h = par\_\lambda_h + m_h, h=1,2, \ldots, P, \qquad (19)$$

in which, $m_h \in R^{1 \times (2N-1)}$ is a mutation weight of the control gain element h.

The new control gain element is added to a control gain set to obtain an expanded new control gain set.

Another embodiment of block B3 is:

each control gain element in the control gain set is determined; if a mutation condition is satisfied, apply an equation (19) to perform mutation operation on the control gain element to generate a new control gain element, the calculation process being as follows:

function mutation( )
m=rand; //a mutation weight is a value between 0 and 1
if (rand<Pm)//if the random number is less than a mutation probability, mutation operation is performed.
//first variable mutation
m1=W1min+(W1max−W1 min)*rand; //mutation weight of a first control gain chi(1)=par(1)+m1;
//second variable mutation
m2=L1min+(L1max-L1min)*rand; //mutation weight of a second control gain
chi(2)=par(2)+m2;
//third variable mutation
m3=L2 min+(L2max-L2 min)*rand; //mutation weight of a third control gain
chi(3)=par(3)+m3;
//a 4th variable is a fitness value
chi(4)=fitness(chi(1), chi(2), chi(3));
else //direct inheritance if not satisfying a mutation condition
chi=par;
end Block B4: control gain elements in the expanded control gain set are preferentially reserved to eliminate control gain elements with poor fitness and obtain an optimized control gain set;

a selection strategy combining roulette with elite retention are adopted to select the control gain element in the expanded control gain set into a new control gain set for next iteration. The roulette strategy enables a control gain element with greater fitness to be selected into a new control gain set with a higher probability, however, one of the disadvantages is that the best control gain element in the older control gain elements may be eliminated. Therefore, in combination with the use of an elite retention strategy, it is ensured that the most excellent control gain element in the previous iterations is retained. Based on these two selection strategies, the number of iterations when calculating the target control gain may be effectively reduced.

As another scheme in the embodiment, block B4 may be arranged between B2 and B3.

Block B5: end iteration calculation to output a target control gain;

the preset number of iterations of the target control gain is 100; if the number of iterations is 100, end iterations, and if the number of iterations is less than 100, continue iterations to execute B3, B4. Finally, a target control gain element is generated by the above iterative calculation process, and the target control gains $W_v^{best}=1, 2, \ldots, N-1$) and $L_v^{best}$ v=1, 2, ..., N) of the target control gain element are the optimal control gains of the robotic fish. According to the convergence condition (8), the last control gain may be derived by an equation $$W_N^{best} = 1 - \sum_{v=1}^{N-1} W_v^{best}.$$

In the embodiment, a calculation method of control gains is creatively improved by blocks B2-B5, and the dual-link robotic fish is controlled through the optimal control gain to achieve the rapid convergence of the swing speed sequence to an expected speed sequence; the keys of obtaining the target control gains by blocks B2-B5 are:

1) a control gain set is constructed, a set of control gains in one control gain element are substituted into a high-order iterative learning control law in an equation (7) to obtain a control input thrust sequence of a dual-link robotic fish, and then the control input thrust sequence is substituted into an equation (3) to obtain a swing speed sequence of the dual-link robotic fish, and a tracking error sequence is calculated according to the difference between the swing speed sequence and the expected speed sequence, thereby obtaining the fitness of the set of control gains according to the tracking error sequence and determining the convergence effect of the set of control gains on the swing speed of the dual-link robotic fish through the fitness; the higher the fitness is, the better the convergence effect of the set of control gains corresponding to the fitness is.

2) a new control gain element is obtained by the expansion scheme of block B3, in which, a part of the new control gain element has a higher fitness than the original control gain element, therefore, the embodiment obtains a better control gain element by block B3. And the expanded control gain set is preferentially reserved through block B4. Not only the optimal part of the new control gain element may be selected, but also the optimal part in the original control gain element may be selected. Through multiple iterations, multiple expansions and optimizations are performed to finally obtain a target control gain.

Block C: the target control gain, the first control input thrust sequence and the first tracking error sequence are input into the high-order iterative learning control law in the equation (7) to obtain a target control input thrust sequence, and the target control input thrust sequence is input into the discrete nonlinear dynamic system in the equation (3) to obtain a swing speed sequence of the robotic fish, and a target tracking error sequence is obtained according to the difference between the swing speed sequence of the robotic fish and the expected speed sequence;

a tracking error index is calculated according to the target tracking error sequence, when the tracking error index is less than a preset range, stop iteration. At this time, the swing speed sequence of the robotic fish is an expected speed sequence, and the embodiment achieves controlling the robotic fish to move according to the expected trajectory.

The effect detection process of the embodiment is as follows:

for a dual-link robotic fish system (1), an iterative learning control law (7) of the order N=2 is used, control gains $W_1$, $L_1$ and $L_2$ in the equation (7) are optimized through evolution calculation, and according to the convergence condition (8), the last control gain may be obtained by $W2=1-W_1$. Assume that a crossover probability is $p_c=0.7$, mutation probability is $p_m=0.3$. The expected output trajectory of the system is $$y_d(i)=0.016[1+\sin(2\pi i/M-\pi/2)], i \in \{0,1, \ldots, M+1\} \quad (20)$$

in which, M=99. In order to evaluate the tracking effort, the following three tracking error indexes are adopted respectively:

1) a sum of absolute errors $SE_k$ $$SE_k = \sum_{i=0}^{100} |e_j(i)| \quad (21)$$

2) a sum of squares of errors $TE_k$ $$TE_k = \sum_{i=0}^{100} [e_j(i)]^2 \quad (22)$$

3) maximum absolute error $ME_k$ $$ME_k = \sup_{i \in \{0,1,\ldots,100\}} |e_j(i)| \quad (23)$$

Figure 3:
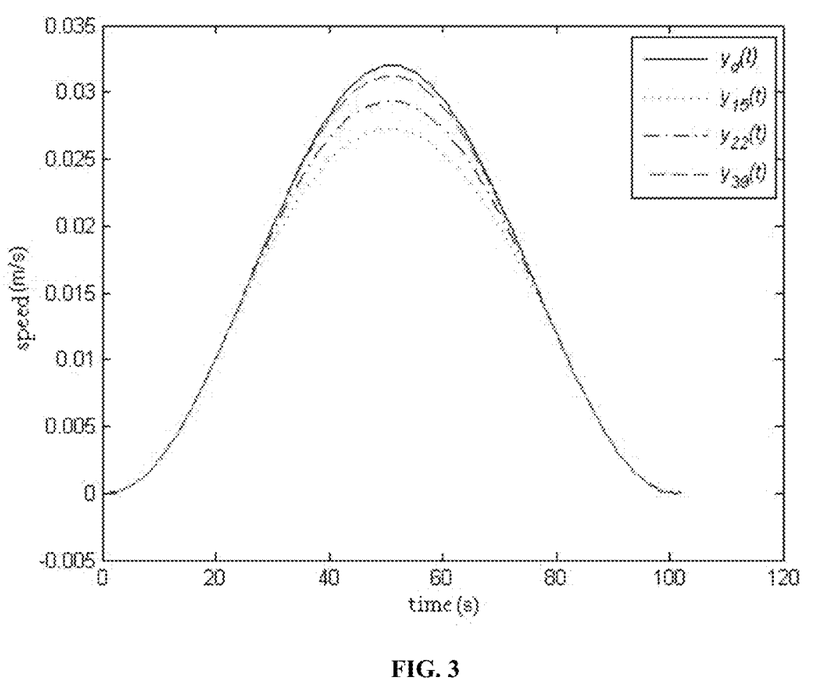
FIG. 3 is a diagram of a system output trajectory of a robotic fish provided in one embodiment of the disclosure.
Figure 4:
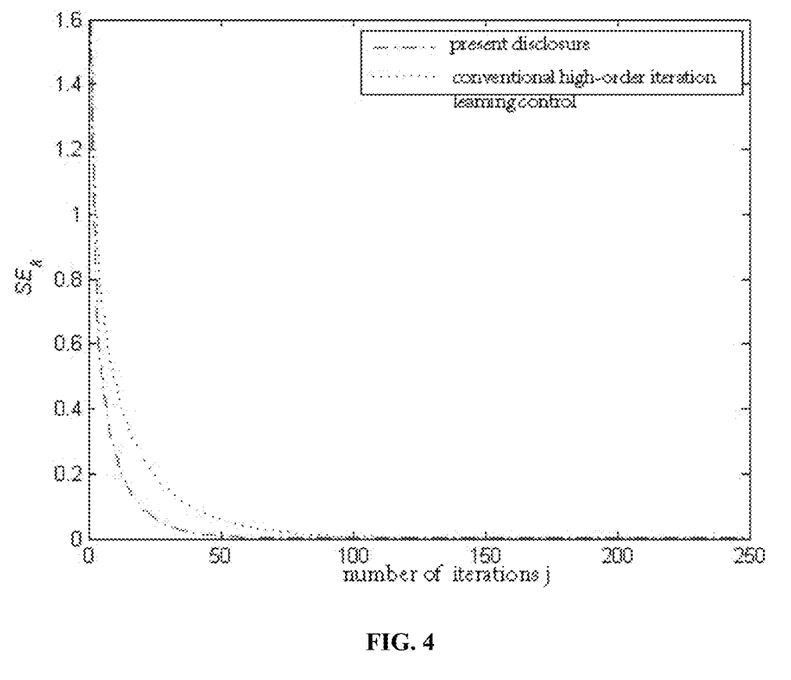
FIG. 4 is a convergence curve of a sum of absolute errors at different iterations provided in one embodiment of the present disclosure.
Figure 5:
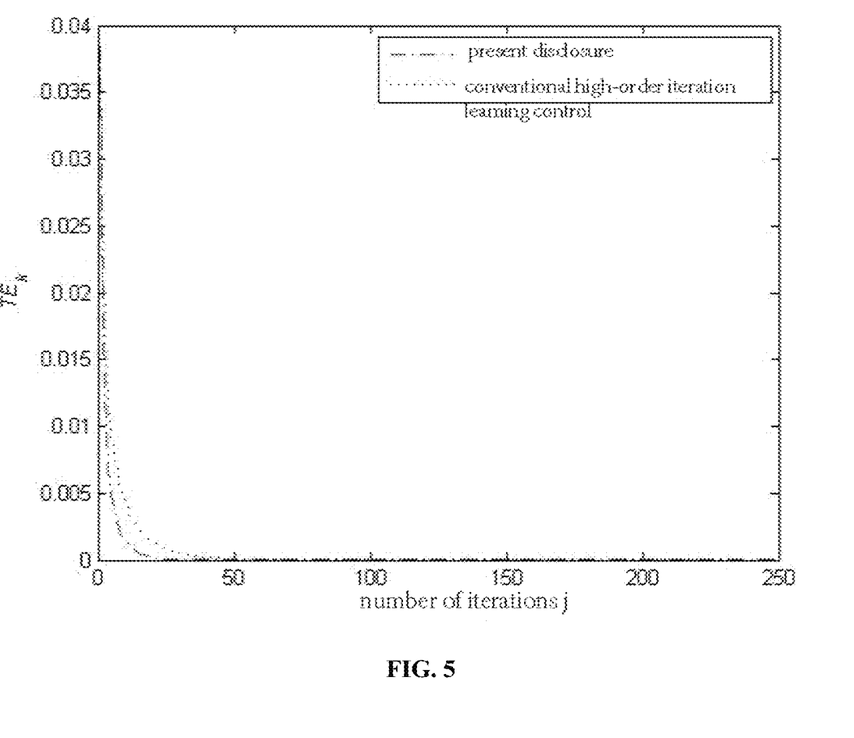
FIG. 5 is a convergence curve of a sum of squares of errors at different iterations provided in one embodiment of the present disclosure.
Figure 6:
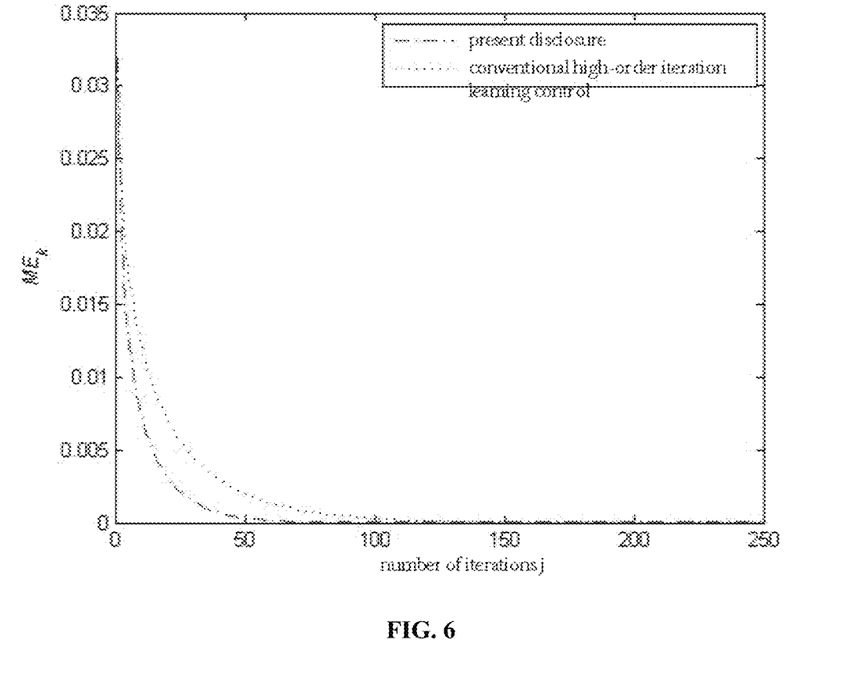
FIG. 6 is a convergence curve of maximum absolute error at different iterations provided in one embodiment of the present disclosure.

Target control gains obtained by evolution calculation 10 times are illustrated in Table 1. The average values $W_1=0.755$, $W_2=0.245$, $L_1=0.4582$ and $L_2=0.446$ of the target control gains obtained by evolution calculation are applied to the high-order iterative learning control law (7) in the embodiment, and when j=15, j=22 and j=39, the output trajectory of the dual-link robotic fish is illustrated in FIG. 3. In order to compare with a conventional method for high-order iterative learning control, a simulation experiment is conducted on a conventional 2-order method for iterative learning control, the control gains being $W_1=0.7$, $W_2=0.3$, $L_1=0.3$ and $L_2=0.2$. FIGS. 4-6 compare sums of absolute errors $SE_k$, sums of squares of errors $TE_k$, and maximum absolute errors $ME_k$ corresponding to the two control methods.

TABLE 1

Target Control Gains Obtained by Evolution Calculation 10 Times

| times | $W_1$ | $W_2$ | $L_1$ | $L_2$ |
|---|---|---|---|---|
| 1 | 0.7474 | 0.2526 | 0.4932 | 0.4570 |
| 2 | 0.7827 | 0.2173 | 0.4724 | 0.4569 |
| 3 | 0.7313 | 0.2687 | 0.4924 | 0.4068 |
| 4 | 0.7972 | 0.2028 | 0.4067 | 0.4856 |
| 5 | 0.7161 | 0.2839 | 0.4209 | 0.4177 |
| 6 | 0.7243 | 0.2757 | 0.4456 | 0.4744 |
| 7 | 0.7465 | 0.2535 | 0.4424 | 0.4678 |
| 8 | 0.7502 | 0.2498 | 0.4209 | 0.4682 |
| 9 | 0.7543 | 0.2457 | 0.4954 | 0.4156 |
| 10 | 0.8000 | 0.2000 | 0.4919 | 0.4101 |
| average value | 0.7550 | 0.2450 | 0.4582 | 0.4460 |

As illustrated in FIG. 3, in the embodiment, a robotic fish may be controlled to achieve complete tracking of a swing speed in the entire operation interval. As illustrated in FIGS. 4-6, a method for high-order iteration self-learning control for a robotic fish proposed in the embodiment has a faster convergence speed than the conventional method for high-order iterative learning control with the same order.

In the embodiment, the problem of accurate speed tracking of a bionic robotic fish by high-order iterative learning control is solved, which is essential for motion control and motion planning. As an intelligent control method, by simulating a "learning" process of a human, according to tracking information of the previous iteration, a recursive technology is utilized to continuously correct a control input signal, gradually reduce system tracking errors, and achieve complete tracking of a trajectory at a fixed interval, which is particularly applied to a dynamic system for repeated tracking motions in the same operation interval. The greatest advantage of the embodiment is that it doesn't depend on a systematic and precise mathematical model, which makes it applicable to a dynamic system with strong coupling, strong nonlinearity, and uncertainty. Therefore, the embodiment has two advantages over the conventional control method: 1) it is not necessary to know a systematic and precise mathematical model; 2) complete tracking in the entire operation interval may be achieved.

In the current method for iterative learning control, first-order iterative learning control is widely applied due to a simple form, such as P-type iterative learning control for a discrete system and D-type iterative learning control for a continuous system. However, these methods for first-order iterative learning control only utilizes tracking information of the previous iteration to update the control input of the current iteration and ignores tracking information of the previous iteration. In order to obtain a faster convergence speed, a high-order iterative learning control algorithm is proposed to generate control input signals of the current iteration by the tracking information of the plurality of historical iterations. It needs to be noted that the tracking performance of a high-order iterative learning control algorithm with appropriate control gains is better than the first-order iterative learning control due to utilizing tracking information of the plurality of historical iterations. Therefore, it is an important problem in the high order iterative learning control design how to select the optimal control gain.

In the embodiment, for the speed tracking problem of the robotic fish, an evolution algorithm is adopted to adaptively select the optimal control gain in the method for high-order iterative learning control. In the embodiment, according to the characteristics of the method for high-order iterative learning control, a coding strategy, population initialization and fitness function of an evolution algorithm are designed to reduce the number of iterations of the evolution algorithm. The designed evolutionary algorithm is applied to high-order iterative learning control to optimize control gains. Compared with the conventional method for high-order iterative learning control, the method for high-order iterative learning control based on the evolution algorithm provided by the embodiment improves a convergence speed of tracking errors and achieves complete tracking of the speed of the robotic fish in the entire operation interval. Moreover, due to the design of the iterative learning control law, it is not necessary to know a systematic and precise mathematical model. The method provided by the embodiment not only is applicable to the above robotic fish model, but also is applicable to other dynamic systems with repeated motions.

Figure 8:
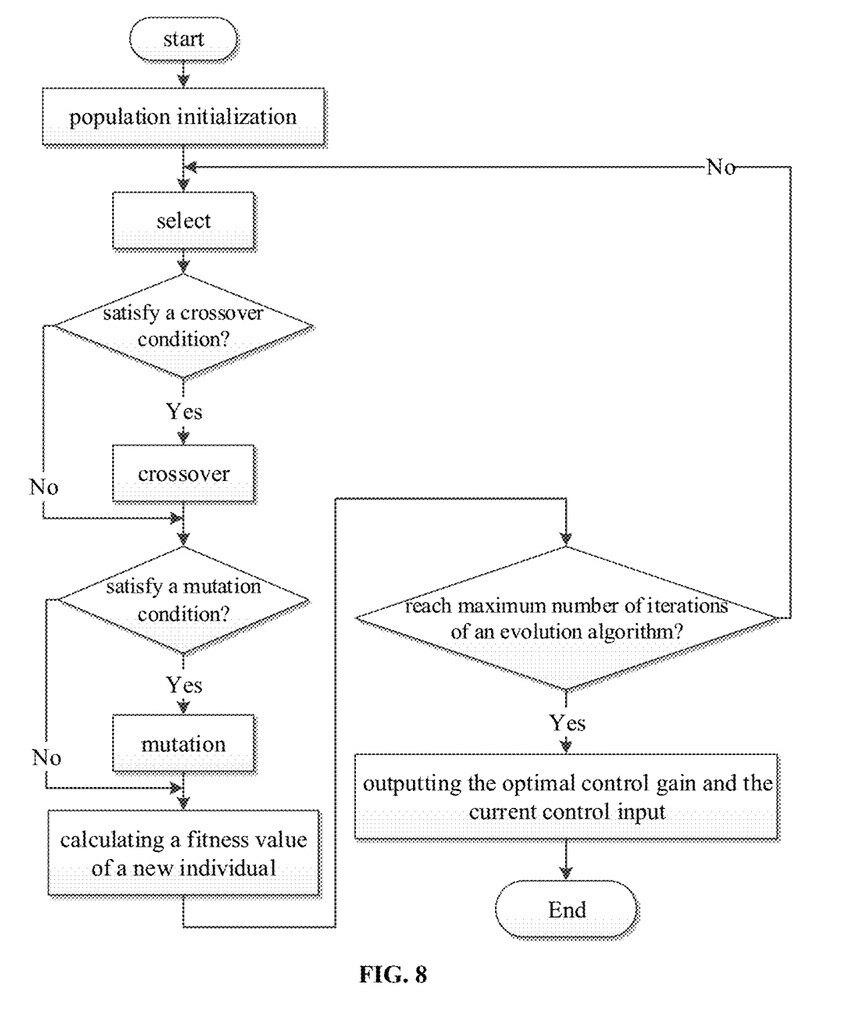
FIG. 8 is a flowchart of a target control input thrust sequence of a robotic fish provided in one embodiment of the present disclosure.

In another preferred embodiment:

As illustrated in FIG. 8, according to the evolution algorithm, the optimal control gain (that is, a target control gain) is obtained through the blocks as illustrated in FIG. 8.

Figure 7:
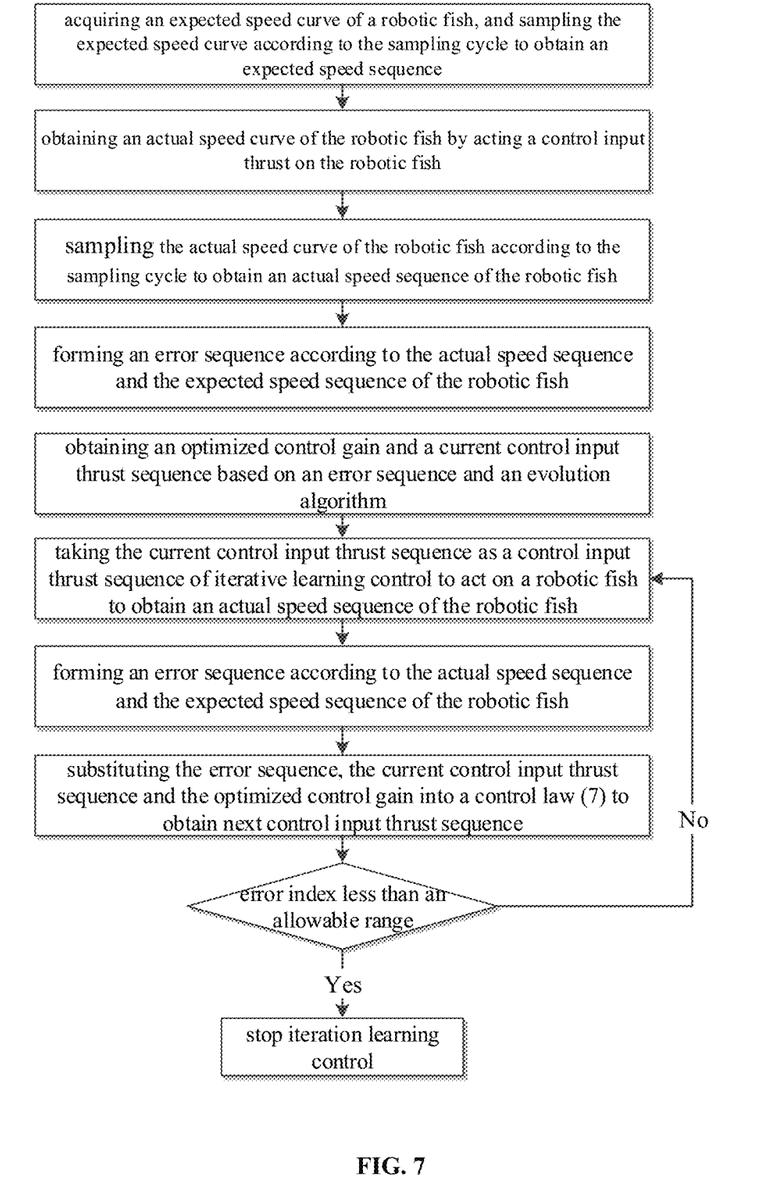
FIG. 7 is a flowchart of an optimal control gain of the robotic fish provided in one embodiment of the present disclosure.

As illustrated in FIG. 7, according to the optimal control gain, the actual speed sequence of the robotic fish is converged to an expected speed sequence according to the blocks illustrated in FIG. 7, and the last control input thrust sequence is output, that is, a target control input thrust sequence, to control the robotic fish to swim according to the expected trajectory.

Figure 2:
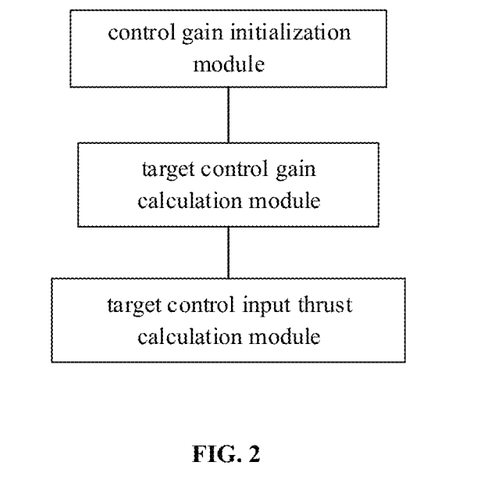
FIG. 2 is a diagram of a structure of an apparatus for controlling a robotic fish provided in one embodiment of the present disclosure.

On the basis of the above embodiment, the disclosure provides an apparatus embodiment as illustrated in FIG. 2:

Another embodiment of the disclosure provides an apparatus for high-order iterative self-learning control for a robotic fish. The apparatus includes a control gain initialization module, a target control gain calculation module and a target control input thrust calculation module;

the control gain initialization module is configured to construct a first control gain set, the first control gain set including N control gain elements, each of the control gain elements including M control gains and one element fitness corresponding to each of the control gain elements; M and N being positive integers;

the target control gain calculation module is configured to perform preferential iteration on control gain elements in the first control gain set to obtain a target control gain set, and output M control gains in the control gain element with the highest fitness in the target control gain set as target control gains;

the target control input thrust calculation module is configured to perform high-order iterative calculation according to the target control gains, the first control input thrust and the first tracking error to obtain a target control input thrust, and control the robotic fish to swing according to the target control input thrust to obtain an expected speed; the initial value of the first control input thrust being a preset value, and the first tracking error being calculated according to the swing speed and the expected speed.

Further, in the control gain initialization module, calculating one fitness corresponding to each of the control gain elements according to the control gain and the first tracking error, is specifically:

acquiring control gain elements to be calculated;

calculating a second control input thrust according to the M control gains in the control gain elements to be calculated and the first tracking error;

controlling the robotic fish to swing according to the second control input thrust to obtain a swing speed, and obtaining a sum of absolute values of second tracking errors according to the difference between the swing speed and the expected speed;

obtaining the fitness of the control gain elements to be calculated according to the difference between a preset first threshold and the sum of absolute values of the second tracking errors.

Further, in the target control gain calculation module, performing preferential iteration on control gain elements in the first control gain set to obtain a target control gain set, specifically includes:

expanding the first control gain set: sequentially determining the control gain elements in the first control gain set to select control gain elements satisfying a first preset condition, and performing crossover operator and mutation operator calculation on the control gain elements satisfying a preset condition to obtain a plurality of new control gain elements for expanding the first control gain set, and adding the new control gain elements to the first control gain set;

preferentially reserving the first control gain set: preferentially reserving all control gain elements in the expanded first control gain set according to a second preset condition to obtain an optimized first control gain set until the number of iterations satisfies a preset second threshold, and outputting the first control gain set as a target control gain set.

It needs to be noted that the apparatus embodiments in the disclosure correspond to the method embodiments, and may implement a method for high-order iteration self-learning control for a robotic fish as described in any one invention method.

On the basis of the above embodiment, the disclosure provides a readable storage medium embodiment;

Another embodiment of the disclosure provides a readable storage medium. The storage medium includes computer programs stored thereon configured to control the device on the readable storage medium to execute the method for high-order iterative self-learning control for a robotic fish as described in the any method embodiment of the disclosure when executed.

In an example, the computer programs may be partitioned into one or more modules stored in the memory and executed by the processor to complete the disclosure. The one or more modules may be a series of computer program instruction segments capable of completing a particular function, the instruction segments being configured to describe an execution process of the computer program in the terminal device.

The terminal device may be a desktop computer, a laptop, a handheld computer, a cloud server and other computing devices. The terminal device may include but not limited to a processor and a memory.

The processor may be a central processing unit (CPU), other general purpose processors, a digital signal processor (DSP), an application specific integrated circuit (ASIC), a field programmable gate array (FPGA) or other programmable logic device, discrete gate or transistor logic device, discrete hardware component, etc.

A general purpose processor may be a microprocessor or the processor may be any conventional processor, the processor being a control center of the terminal device configured to connect various parts of the entire terminal device with various interfaces and lines.

The memory may be configured to store the computer program and/or module, and the processor runs or executes computer programs and/or modules in the memory and calls data stored in the memory to execute various functions of the terminal device. The memory may mainly include a program storage area and a data storage area; the program storage area may store operating systems and applications required by the at least one function (for example, audio playback function, image playback function); the data storage area may store data created by the use of a mobile phone (for example, audio data, a phone book), etc. In addition, the memory may include a high-speed random access memory, and may also include a non-volatile memory, such as a hard disk, a memory, a plug-in hard disk, a smart memory card (SMC), a secure digital (SD) card, a flash memory card, at least one magnetic disk storage device, flash memory device, or other volatile solid state memory devices.

The integrated module/unit of the terminal device may be stored in a computer readable storage medium (that is, the above readable storage medium) when it is implemented in the form of a software functional unit and sold and used as an independent product. On the basis of such understanding, all or part of processes in the above embodiments may be implemented by computer programs to instruct relevant hardwares. The computer programs may be stored in a computer readable storage medium and implement blocks in the above method embodiments when executed by a processor. The computer programs includes computer program codes, which may be in the form of source codes, object codes, executable files or some intermediate forms. The computer readable medium may include any entity or apparatus that may carry computer program codes such as a record medium, a USB disk, a mobile hard disk drive, a magnetic disk, an optical disk, a computer memory, a read-only memory (ROM), a random access memory (RAM), a carrier signal, a telecommunication signal and a software distribution medium.

It should be noted that, the apparatus embodiments described above are only schematic, in which the above units described as separate parts may or may not be physically separated, the parts shown as units may or may not be physical units, which may be located in one place, or may be distributed to multiple network units. Some or all modules may be selected according to the actual requirements to achieve the purpose of the present disclosure. In addition, in the figures of the apparatus embodiments provided in the disclosure, a connection relationship between modules represents they are communicatively connected with each other, and may be implemented as one or more communication buses or signal lines. Those skilled in the art may understand and implement it without any creative effort.

The foregoing are preferred embodiments of the present disclosure. It should be noted that, for those skilled in the art, several improvements and modifications may be made without departing from the principles of the present disclosure, and the improvements and modifications are also considered to be within the protection scope of the present disclosure.

Those skilled in the art may understand that all or part of processes in the above embodiments may be implemented by instructing relevant hardwares by computer programs. The programs may be stored in a computer readable storage medium, and the programs may include processes of the above embodiments when executed. The storage medium may be a magnetic disk, an optical disk, a read-only memory (ROM), a random access memory (RAM), etc.

What is claimed:

1. A method for high-order iterative self-learning control for a robotic fish, comprising:
   constructing a first control gain set, the first control gain set comprising N control gain elements, each of the control gain elements comprising M control gains and one element fitness corresponding to each of the control gain elements; M and N being positive integers;
   performing preferential iteration on control gain elements in the first control gain set to obtain a target control gain set, and outputting M control gains in the control gain element with the highest fitness in the target control gain set as target control gains;
   performing high-order iterative calculation according to the target control gains, the first control input thrust and a first tracking error to obtain a target control input thrust, and
   controlling the robotic fish to swing according to the target control input thrust to obtain an expected speed; the initial value of the first control input thrust being a preset value, and the first tracking error being calculated according to the swing speed and the expected speed.

2. The method of claim 1, wherein, calculating one fitness corresponding to each of the control gain elements according to the control gains and the first tracking error, specifically:
   acquiring control gain elements to be calculated;
   calculating a second control input thrust according to the M control gains in the control gain elements to be calculated and the first tracking error;
   controlling the robotic fish to swing according to the second control input thrust to obtain a swing speed, and obtaining a sum of absolute values of second tracking errors according to the difference between the swing speed and the expected speed;
   obtaining the fitness of the control gain elements to be calculated according to the difference between a preset first threshold and the sum of absolute values of the second tracking errors.

3. The method of claim 2, wherein, performing preferential iteration on control gain elements in the first control gain set to obtain a target control gain set, specifically comprising:
   expanding the first control gain set: sequentially determining control gain elements in the first control gain set to select control gain elements satisfying a first preset condition, and performing crossover operator and mutation operator calculation on the control gain elements satisfying a preset condition to obtain a plurality of new control gain elements for expanding the first control gain set, and adding the plurality of new control gain elements to the first control gain set;
   preferentially reserving the first control gain set: preferentially reserving all the control gain elements in the expanded first control gain set according to a second preset condition to obtain an optimized first control gain set until the number of iterations satisfies a preset second threshold, and outputting the first control gain set as a target control gain set.

4. The method of claim 3, wherein, preferentially reserving all the control gain elements in the expanded first control gain set according to a second preset condition to obtain an optimized first control gain set, specifically:
   selecting the control gain elements in the expanded first control gain set according to a roulette strategy and an elitism strategy to obtain an optimized first control gain set.

5. The method of claim 4, wherein, performing high-order iterative calculation according to the target control gains, the first control input thrust and the first tracking error to obtain a target control input thrust, specifically comprising:
   iteratively calculating a target control input thrust according to the target control gains, the first control input thrust and the first tracking error, controlling the robotic fish to swing according to the current target control input thrust in each iterative calculation, and then obtaining a target tracking error, and according to the current target tracking error and the target control input thrust, updating the first control input thrust and the first tracking error until outputting the current target control input thrust when the target tracking error satisfies a preset index condition.

6. The method of claim 1, wherein, controlling the robotic fish to swing according to the target control input thrust to obtain an expected speed, specifically controlling the robotic fish to swing according to a target control input thrust sequence to obtain an expected speed sequence thereby achieving an expected trajectory.

7. An apparatus for high-order iterative self-learning control for a robotic fish, comprising
   a control gain initialization module, a target control gain calculation module and a target control input thrust calculation module;
   wherein, the control gain initialization module is configured to construct a first control gain set, the first control gain set comprising N control gain elements, each of the control gain elements comprising M control gains and one element fitness corresponding to each of the control gain elements; M and N being positive integers;
   the target control gain calculation module is configured to perform preferential iteration on control gain elements in the first control gain set to obtain a target control gain set, and output M control gains in the control gain element with the highest fitness in the target control gain set as target control gains;
   the target control input thrust calculation module is configured to perform high-order iterative calculation according to the target control gains, the first control input thrust and a first tracking error to obtain a target control input thrust, and control the robotic fish to swing according to the target control input thrust to obtain an expected speed; the initial value of the first control input thrust being a preset value, and the first tracking error being calculated according to the swing speed and the expected speed.

8. The apparatus of claim 7, wherein, in the control gain initialization module, calculating one fitness corresponding to each of the control gain elements according to the control gain and the first tracking error, specifically:
   acquiring control gain elements to be calculated;
   calculating a second control input thrust according to the M control gains in the control gain elements to be calculated and the first tracking error;
   controlling the robotic fish to swing according to the second control input thrust to obtain a swing speed, and obtaining a sum of absolute values of second tracking errors according to the difference between the swing speed and the expected speed;
   obtaining the fitness of the control gain elements to be calculated according to the difference between a preset first threshold and the sum of absolute values of the second tracking errors.

9. The apparatus of claim 7, wherein, in the target control gain calculation module, performing preferential iteration on control gain elements in the first control gain set to obtain a target control gain set, specifically comprising:
   expanding the first control gain set: sequentially determining the control gain elements in the first control gain set to select control gain elements satisfying a first preset condition, and performing crossover operator and mutation operator calculation on the control gain elements satisfying a preset condition to obtain a plurality of new control gain elements for expanding the first control gain set, and adding the new control gain elements to the first control gain set;
   preferentially reserving the first control gain set: preferentially reserving all the control gain elements in the expanded first control gain set according to a second preset condition to obtain an optimized first control gain set until the number of iterations satisfies a preset second threshold, and outputting the first control gain set as a target control gain set.

* * * * *